United States Patent [19]

Gamache

[11] Patent Number: 5,431,422
[45] Date of Patent: Jul. 11, 1995

[54] TANK TRUCK

[75] Inventor: Ronald A. Gamache, 110 Overlook Dr., Prattville, Ala. 36066

[73] Assignee: Ronald A. Gamache, Prattville, Ala.

[21] Appl. No.: 144,412

[22] Filed: Nov. 2, 1993

[51] Int. Cl.$^6$ .............................................. B62B 1/04
[52] U.S. Cl. .............................. 280/47.19; 280/655.1; 280/47.26; 414/448
[58] Field of Search .................. 280/47.19, 47.2, 47.26, 280/47.28, 47.17, 47.131, 47.371, 79.7, 79.6, 79.5, 655.1, 47.315; 414/444, 445, 448

[56]     References Cited
U.S. PATENT DOCUMENTS

| | | | |
|---|---|---|---|
| 2,317,064 | 4/1943 | Josephian | 280/79.3 |
| 2,539,336 | 1/1951 | Sobers | 280/47.19 |
| 2,687,895 | 8/1954 | Rutledge | 280/47.26 |
| 2,901,261 | 8/1959 | Olvey | 280/47.19 |
| 3,064,991 | 11/1962 | Huthsing, Jr. | 280/47.26 X |
| 3,235,094 | 2/1966 | Otto et al. | 248/907 |
| 4,205,937 | 6/1980 | Fawley | 280/47.19 X |
| 4,294,481 | 10/1981 | Pearl | 280/47.19 X |
| 4,753,445 | 6/1988 | Ferrare | 280/47.17 X |
| 5,131,670 | 7/1992 | Clements et al. | 280/47.131 X |

Primary Examiner—Margaret A. Focarino
Assistant Examiner—Carla Mattix

[57]     ABSTRACT

A hand truck for transporting compressed air tanks. The hand truck has the capacity to carry one, two or three tanks at one time. During transport, the tanks are held in place by a plastic spring clip. The tank truck folds to a compact size to facilitate moving and storing. The tank truck may be fabricated from steel or aluminum. No tools are required to fold or unfold the tank truck.

1 Claim, 4 Drawing Sheets

TANK TRUCK

BACKGROUND OF THE INVENTION

Some difficulty is encountered in transporting scuba tanks to and from various locations that are required in the normal sequence of their use. Carts, wagons, conventional hand trucks, etc. can of course be used; however, none of these methods are well suited for this task. They provide limited security, require cumbersome strapping or tying and are not practical to carry from location to location.

SUMMARY OF THE INVENTION

The invention relates to a method of transporting compressed air tanks that requires a minimum amount of time and physical effort in order to load the tanks onto the tank truck and also to unload or remove the tanks from the tank truck. Upon being loaded onto the tank truck the tanks are held firmly in place by a molded clip which also protects the tank from being scratched or damaged. No tools are required to load the tanks onto the tank truck nor are any fasteners other than the aforementioned molded clip required to secure the tanks to the tank truck. Other than while loading and unloading, the tank truck may be operated in the same manner as a conventional set of hand trucks.

Another object of the invention is to provide a utility that is portable, requires no tools nor the separating of parts, with the exception of two spring-loaded quick pins in order to fold up for carrying or storing.

With the considerations and inventive objects herein set forth, and such other advantages or novel features as may become apparent from consideration of this disclosure and specification, the present invention consists of the inventive concept which is comprised or included in the construction, arrangement, or combination of parts with references to the accompanying figures in which.

In the drawings, like characters of reference indicate corresponding parts in the different figures.

DETAILED DESCRIPTION

Figure 1:
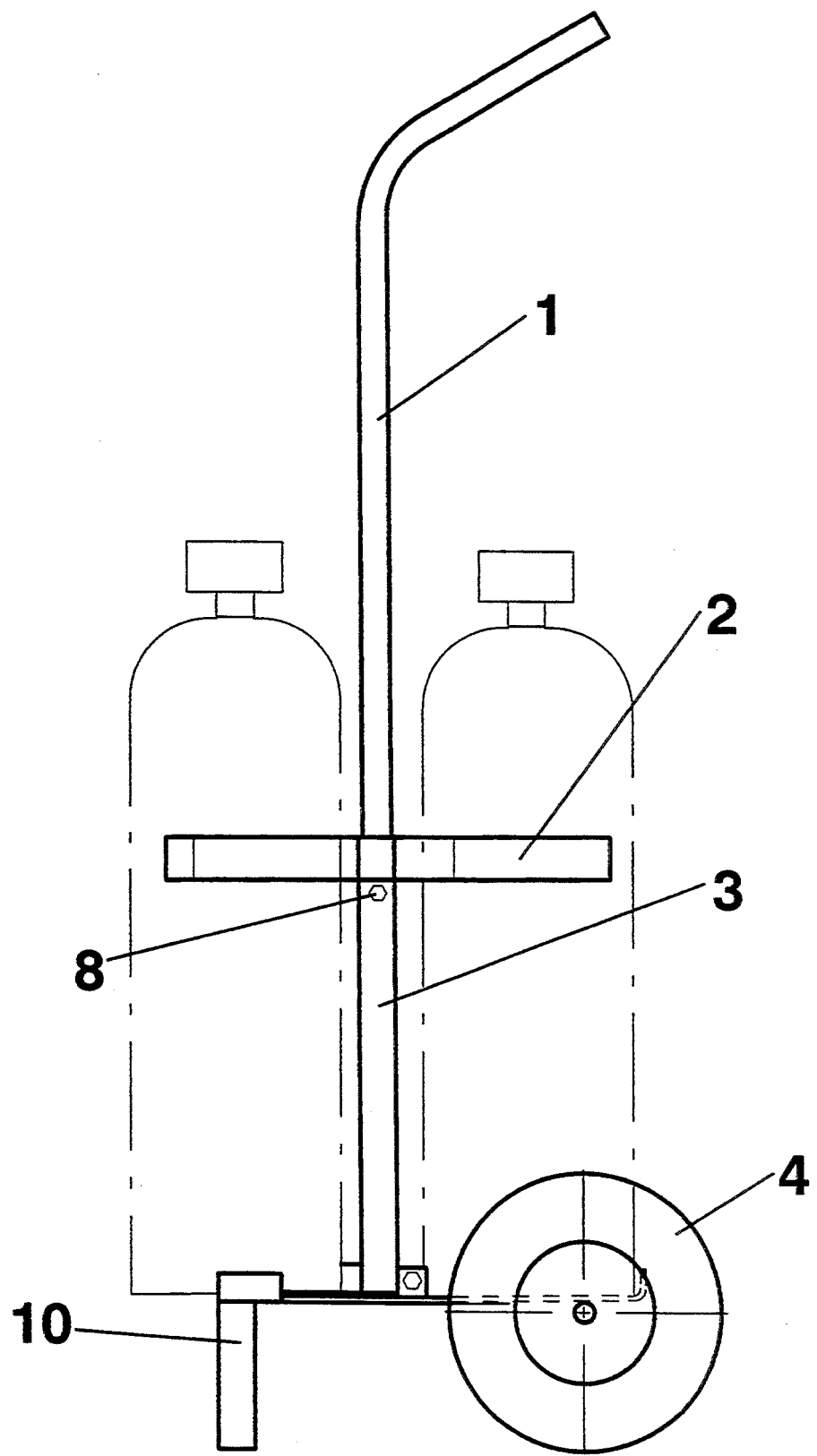
FIG. 1 is a side elevation showing the tank truck components in a ready to use arrangement.
Figure 2:
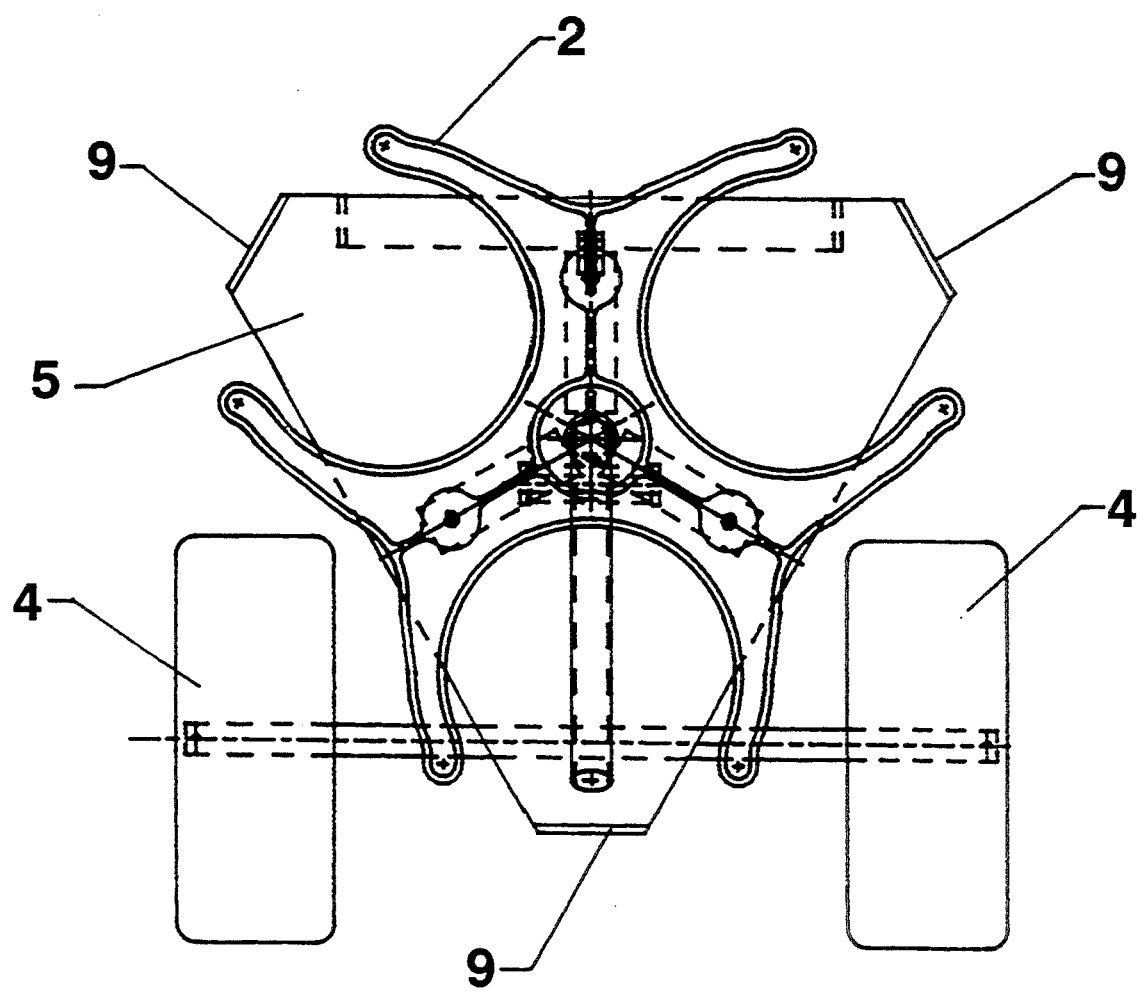
FIG. 2 is a plan view showing the three-pocket spring clip and the triangular shaped base plate.

Proceeding to describe my invention in detail, reference should first be made to FIGS. 1 and 2 which show a scuba tank truck on which are mounted a quantity of three scuba tanks. The tank retaining device, which is an important feature of this invention, is comprised of a single piece plastic retainer (2) the embodiment of which contains three radiused openings in a horizontal plane arranged symmetrically about the center point of the piece.

The plastic retainer (2) is supported by and attached to the upper end of the vertical mast link (3). See FIG. 3. The embodiment of said mast link (3) being comprised of a single straight length of tube to the lower end of which and permanently fixed are located a pivot tube (11) and a positioning strap (12).

The vertical mast link (3) is attached to a base plate (5) by means of pivot bolt (7) and hinge release pin (6) in conjunction with a pattern of lugs permanently fixed to the base plate which locate the center of the mast link tube (3) over the center point of the base plate (5). The embodiment of said base plate (5) being comprised of a flat triangular shaped plate the points of which being formed up at 90 degrees produce three equal flanges (9) located symmetrically about the center point of the base plate (5).

The base plate is supported by the front support bracket (10) when the scuba tank truck is parked or in an otherwise idle state. The base plate (5) when not supported by the front support bracket (10), is supported by the axle and wheel assembly (4). The axle is attached to the base plate (5) at 90 degrees to the center line of the trailing point of the three point base plate (5). This arrangement provides equal access to the plastic retainer (2).

The scuba tanks are loaded onto the scuba tank truck (FIG. 2) by positioning the bottom of the tank inside the flange (9) and forcing the scuba tank into the plastic retainer (2) which grips the upper part of the scuba tank. No additional action is required to hold the scuba tank in transpod position. To remove the scuba tank from the scuba tank truck, hold the handle (FIG. 1) in one hand and gripping the top of the tank with the other hand, give the tank a brisk pull and the plastic retainer will release the tank.

Figure 3:
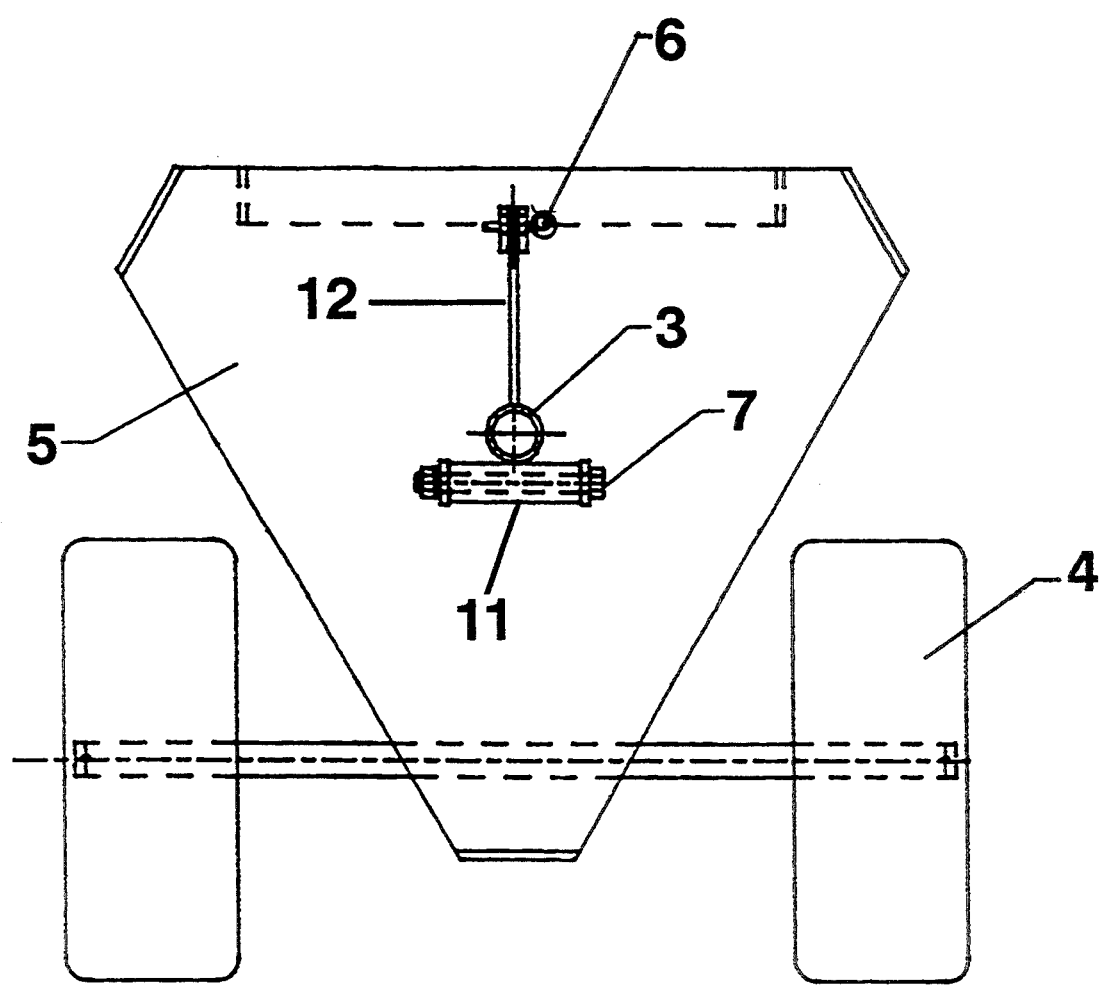
FIG. 3 is a section view showing the base plate and axle arrangement as well as the mast pivot and latch mechanism.
Figure 4:
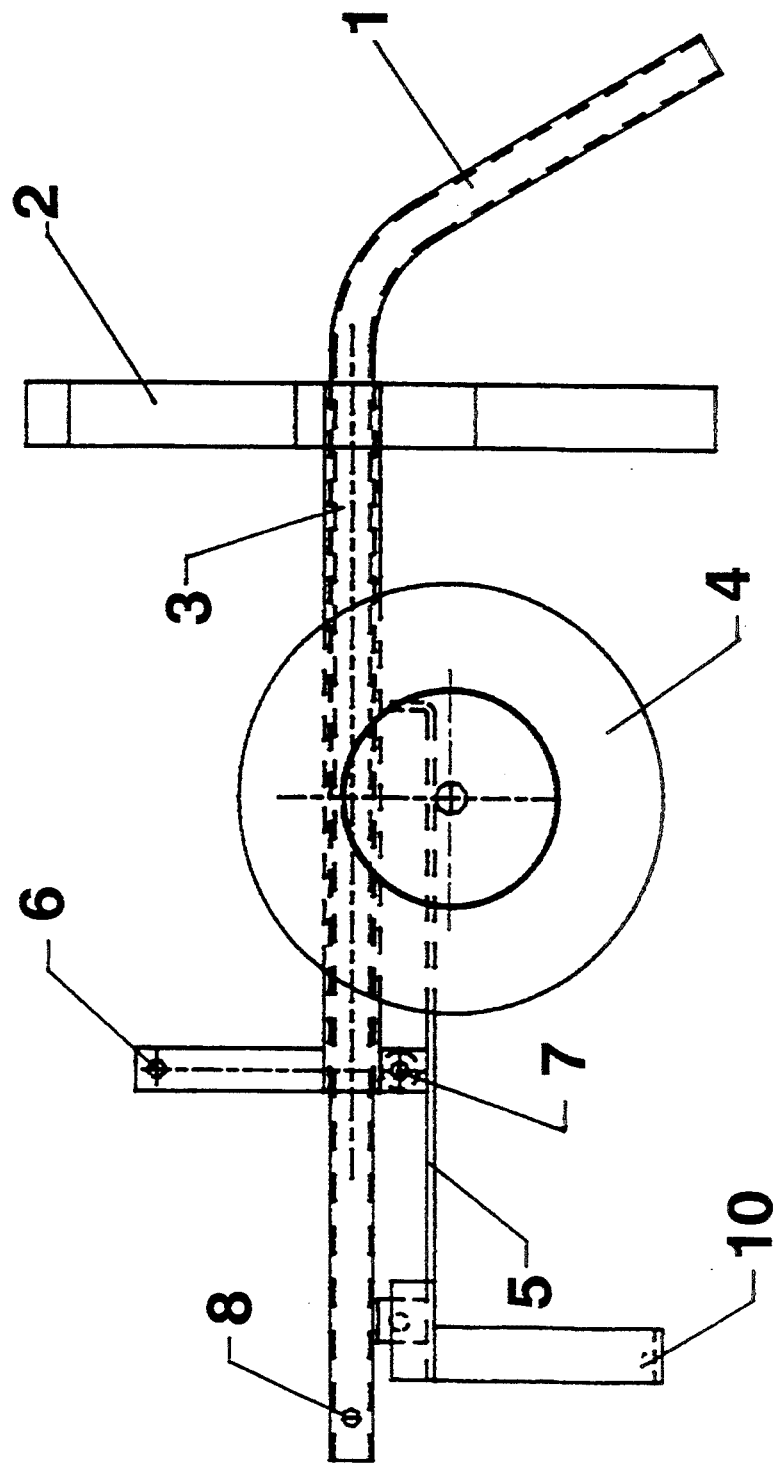
FIG. 4 is a side elevation showing the tank truck in a folded position with the mast rotated clockwise 90 degrees and the handle pushed forward to lock the assembly.

In order to reposition components of the scuba tank truck for moving or storing, reference FIG. 3. Remove quick pin (6). Rotate the mast (3) and handle (1) approximately 90 degrees in a clockwise direction. Remove handle quick pin (8) and slide handle (1) through the mast to position shown in FIG. 4 which locks the mast (3) in relation to the base plate (5). This maneuver renders the scuba tank truck to a compact size to be moved or stored.

Attention should now be made to the various materials from which the scuba tank truck may be fabricated. To produce a heavy duty low cost scuba tank truck, the afore described components; base plate (5), vertical mast (3), handle (1), pivot tube (11), and positioning strap (12) may be fabricated from steel. To produce a lightweight scuba tank truck the afore listed components may be fabricated from aluminum.

I claim:

1. A scuba tank truck for carrying scuba tanks, comprised of a molded plastic three pocket retainer of symmetrical shape, each pocket being a spring clip adapted to engage a scuba tank, said retainer mounted in a horizontal plane to an upper end of a vertical mast link which passes through a center point of said retainer, said mast link being comprised of a straight length of tubing having a handle slidable within said upper end of the mast link, a lower end of said mast link being connected to a horizontal pivot tube, a positioning strap attached at one end to said lower end of the mast link and attached at an opposite end by a release pin to a triangular base plate, the pivot tube being pivotable about a horizontal axis to fold said mast link and handle when the pin is released, said base plate being supported by a single axle mounted transverse to the longitudinal axis of the truck, said axle being supported by two wheels, one mounted at each end of said axle on opposite sides of the base plate, and a support bracket mounted to an underside of the base plate which maintains the base plate in a horizontal plane when in a stable position.

* * * * *